Nov. 24, 1925.

J. G. SISSON 1,562,923

MEASURING DEVICE

Filed May 15, 1922     3 Sheets-Sheet 1

Inventor
J. G. SISSON

Nov. 24, 1925.
J. G. SISSON
1,562,923
MEASURING DEVICE
Filed May 15, 1922
3 Sheets-Sheet 2
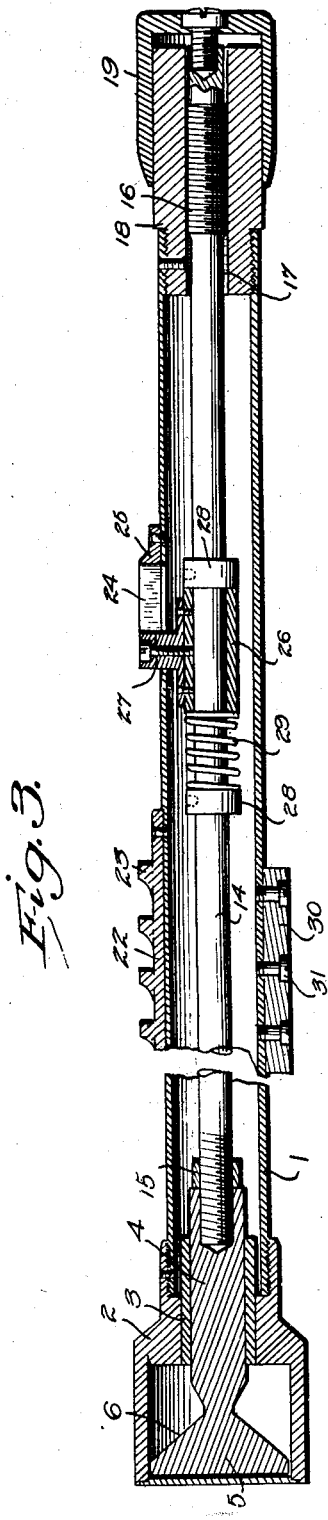
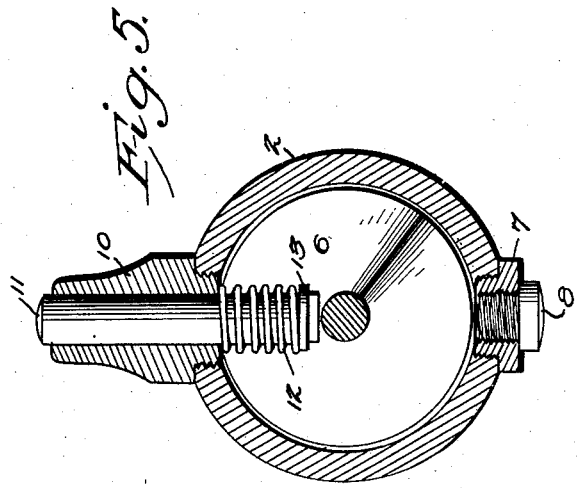
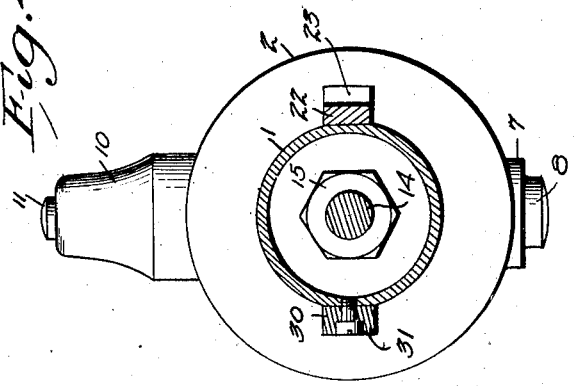
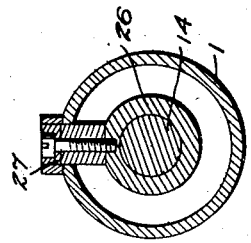
Inventor
J. G. SISSON

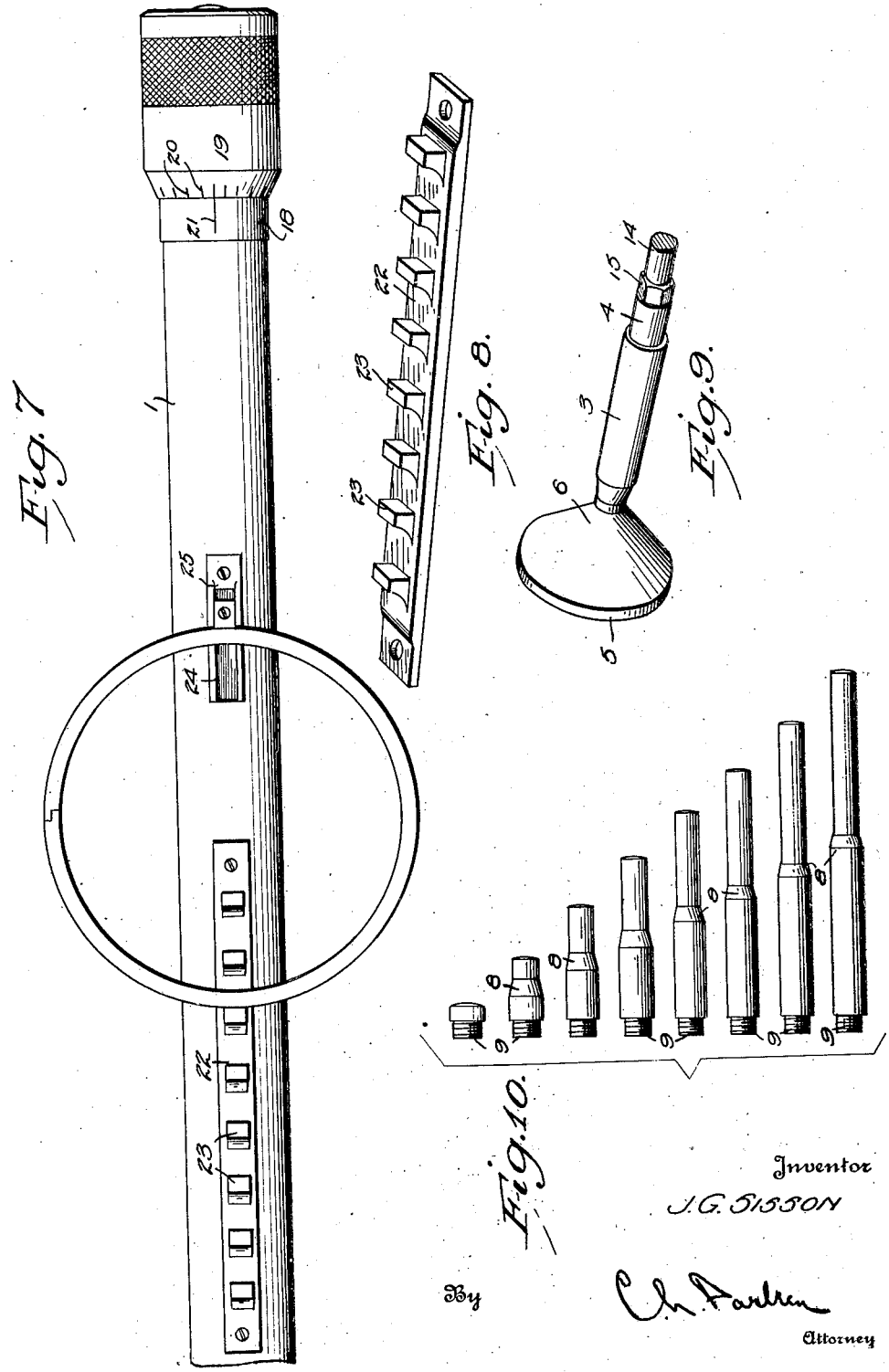

Patented Nov. 24, 1925.

1,562,923

UNITED STATES PATENT OFFICE.

JAMES G. SISSON, OF ATHOL, MASSACHUSETTS.

MEASURING DEVICE.

Application filed May 15, 1922. Serial No. 560,993.

*To all whom it may concern:*

Be it known that I, JAMES G. SISSON, a citizen of the United States, residing at Athol, in the county of Worcester and State of Massachusetts, have invented certain new and useful Improvements in Measuring Devices, of which the following is a specification.

This invention relates to measuring instruments, and more particularly to a tool for measuring the size of cylinders and piston rings.

An object of the invention is the provision of a measuring instrument capable of indicating fractions of inches that may be inserted in a cylinder for measuring the interior diameter of the cylinder.

A further object is the provision of an instrument having an operating member consisting of a shaft, a cone mounted on the end of the shaft, and a plunger arranged at right angles thereto adapted to engage the cone.

A further object is the provision of an instrument including a shaft carrying a movable member for measuring the external diameter of piston rings.

In the accompanying drawings, I have shown one embodiment of the invention. In this showing:

Figure 3 is a similar view at right angles to Figure 2,

Figure 4 is a transverse sectional view on line 4—4 of Figure 1,

Figure 5 is a similar view on line 5—5 of Figure 1,

Figure 6 is a similar view on line 6—6 of Figure 1,

Figure 7 is a plan view of a portion of the instrument showing a piston ring in position to be measured, Figure 8 is a detail view of a portion of the piston ring measuring device, Figure 9 is a detail perspective view of the cone and shaft, and, Figure 10 is a plan view of a plurality of interchangeable sizing rods used in measuring cylinders.

Figure 1:
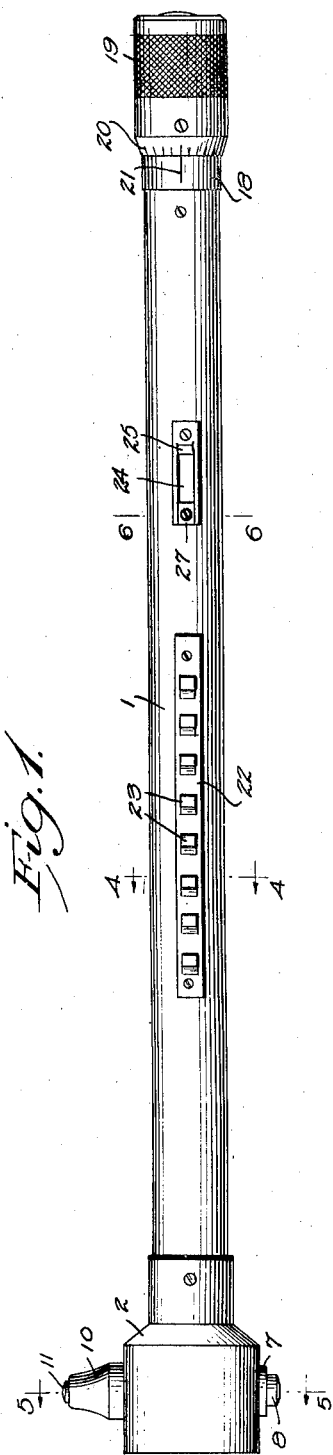
Figure 1 is a plan view.
Figure 2:
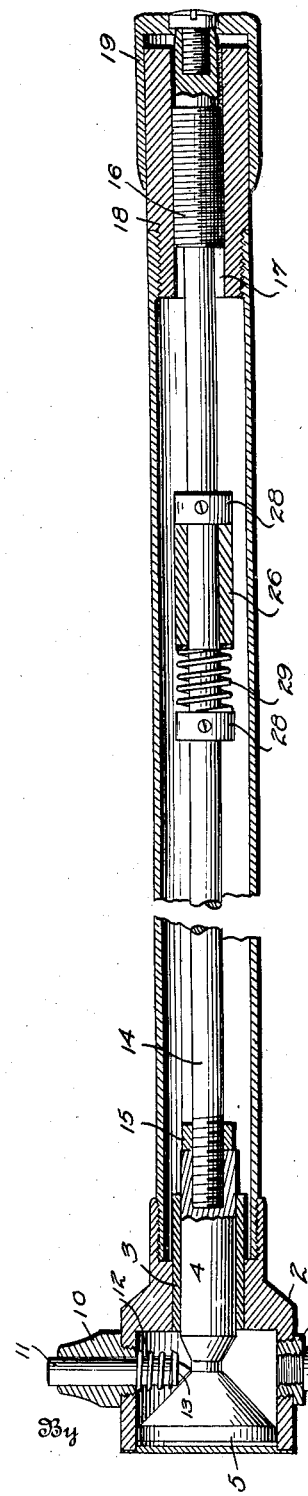
Figure 2 is a central longitudinal sectional view.

Referring to the drawings, the reference numeral 1 designates the body of the instrument or handle, and consists of a hollow tubular member having a head 2 secured to one end in any suitable manner. A bushing 3 is arranged at the inner end of the head and this bushing forms a bearing for a shaft 4 which extends into the head. The shaft is provided with a cone 5 on its outer end and the face 6 of this cone is at an angle of 45° to the shaft, whereby the cone defines a right angle at its apex. The head is provided with a pair of oppositely disposed openings, one of which is adapted to receive a bushing 7. This bushing is provided with a threaded opening for the reception of sizing rods 8. As shown in Figure 10 of the drawings, a plurality of sizing rods form a part of the instrument and are interchangeably mounted in the bushing 7. The sizing rods are provided with threaded ends 9. The opposite opening is adapted to receive a bushing 10 having a central opening therein for the reception of a plunger 11. A spring 12 is arranged on the plunger within the head, one end of the spring bearing against the inner wall of the head and the other end bearing against a washer or enlargement 13 at the inner end of the plunger.

The shaft 4 is provided with a threaded opening at its inner end adapted to receive the threaded end of an operating shaft 14. As shown, a lock nut 15 may be arranged on the operating shaft to retain the parts in position. The other end of the operating shaft is provided with an adjusting screw 16. This adjusting screw is received in a threaded opening 17 formed in a member 18 secured to the outer end of the handle. A cap 19 is secured to the end of the operating shaft and fits over the member 18. As shown, this cap is provided with suitable graduations 20 adapted to cooperate with a zero indication 21 formed on the member 18 to permit micrometer readings.

Means are provided for determining the diameter of piston rings. As shown, a plate 22 is secured to the exterior of the handle and this plate is provided with a plurality of spaced measuring members 23 arranged at a predetermined distance from each other. The handle is provided with a slot 24 spaced from the plate 22, the adjacent end of the slot being a definite and known distance from each of the measuring devices. A slotted plate 25 is arranged over the slot in the handle. A sleeve 26 is mounted on the operating shaft and this sleeve is provided with a projection 27 passing through the slot 24. A pair of washers 28 are secured to the operating shaft on opposite sides of the sleeve and are adapted to move with the shaft to adjust the sleeve. A spring 29 may be arranged between one of the washers and the sleeve. The handle may further be provided with a plate 30 secured thereto in any suitable manner, as by screws 31 and preferably arranged opposite the piston ring measuring device. This plate is employed for securing the instrument between the jaws of a vice when measuring piston rings and thus prevents injury to the handle of the instrument.

In operation, the proper sizing rod 8 is arranged in the bushing 7. These sizing rods are of a predetermined length to give definite distances from the outer face of a given sizing rod to the outer face of the plunger when the micrometer scale is at zero with the plunger engaging the cone adjacent its apex. A series of sizing rods shown are furnished to give readings from 2½ inches to 6 inches, each sizing rod being ½ inch longer than the next smallest one. The instrument is thus adjusted with the proper size rod to determine the size of the cylinder within ½ inch and the operating shaft is then drawn inwardly by revolving the cap 18, causing the plunger 11 to ride over the cone toward its base and thus be projected. When the plunger is projected to the point where it engages the wall of the cylinder, the distance that it has been projected may be read upon the micrometer gauge 20 and 21 and the size of the cylinder may be determined to one-thousandth of an inch.

In measuring piston rings, the ring is arranged as shown in Figure 7 of the drawings, engaging one of the measuring devices 23. The ring is placed on the measuring device that will position the opposite side of the ring over the slot 24 and the projection 27 is arranged at the inner end of the slot, opposite to the showing in Figure 3 of the drawings. It is then adjusted inwardly by revolving the shaft until it engages the piston ring and the fraction of an inch over the size for the given member 23 may be read on the micrometer gauge.

It will be apparent that I have provided a very simple and efficient tool or instrument for measuring the size of piston rings and the internal diameter of cylinders and that by means of the construction, it is possible to obtain micrometer readings or readings to very small fractions of an inch, thus permitting the greatest degree of accuracy when this instrument is employed.

It is to be understood that the form of my invention herewith shown and described is to be taken as a preferred example of the same, and that various changes in the shape, size, and arrangement of parts may be resorted to without departing from the spirit of the invention or the scope of the subjoined claim.

Having thus described my invention, I claim:

In a device of the character described, a tubular member, a head mounted on one end of said member, a shaft mounted in said tubular member, a cone arranged in said head and having its apex secured to said shaft, said head being provided with oppositely disposed threaded openings, bushings mounted in said openings, one of said bushings being provided with a threaded opening, a removable sizing rod arranged therein, the other of said bushings being provided with an opening, a plunger arranged therein and engaging said cone, a collar formed on said plunger adjacent said inner end, a spring surrounding said plunger and engaging said collar to oppose outward movement of said plunger, an interiorly threaded member arranged in the opposite end of said tubular member, said shaft being provided with a threaded portion engaging the threads of said member, and a cap carried by said shaft and arranged over the end of said interiorly threaded member, said threaded member and said cap being provided with indicia to permit calculation of the movement of said shaft and consequent projection of said plunger.

In testimony whereof, I affix my signature.

JAMES G. SISSON.